United States Patent
Abrashkevich et al.

(10) Patent No.: US 11,681,695 B2
(45) Date of Patent: *Jun. 20, 2023

(54) AGGREGATION IN DYNAMIC AND DISTRIBUTED COMPUTING SYSTEMS

(71) Applicant: INTERNATIONAL BUSINESS MACHINES CORPORATION, Armonk, NY (US)

(72) Inventors: Dmitri Abrashkevich, Richmond Hill (CA); Ioanna Maria Attarian, Toronto (CA); Robert Neugebauer, Stouffville (CA); David Vyvyan, Southampton (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/964,924

(22) Filed: Oct. 13, 2022

(65) Prior Publication Data

US 2023/0049730 A1     Feb. 16, 2023

Related U.S. Application Data

(63) Continuation of application No. 15/827,674, filed on Nov. 30, 2017, now Pat. No. 11,475,000.

(51) Int. Cl.
*G06F 16/242* (2019.01)
*G06F 16/23* (2019.01)
(Continued)

(52) U.S. Cl.
CPC ............ *G06F 16/244* (2019.01); *G06F 16/23* (2019.01); *G06F 16/2452* (2019.01); *G06F 16/27* (2019.01); *G06F 16/284* (2019.01)

(58) Field of Classification Search
CPC ............... G06F 16/244; G06F 16/2452; G06F 16/2458; G06F 16/2471; G06F 16/256; G06F 16/284; G06F 16/27; G06F 16/23
See application file for complete search history.

(56) References Cited

U.S. PATENT DOCUMENTS

| 6,847,962 B1 | 1/2005 | Cochrane |
| 7,428,220 B1 | 9/2008 | Caronni |

(Continued)

FOREIGN PATENT DOCUMENTS

| CN | 104123374 A | 10/2014 |
| CN | 104394149 A | 3/2015 |

(Continued)

OTHER PUBLICATIONS

IBM: List of IBM Patents or Patent Applications Treated as Related, 2 pg.

(Continued)

*Primary Examiner* — James E Richardson
(74) *Attorney, Agent, or Firm* — Cuenot, Forsythe & Kim, LLC

(57) ABSTRACT

Aggregation in a computing system can include receiving, at a service node of the computing system, a first query specifying aggregation and translating the first query into a second query having a first canonical format and specifying the aggregation. The method can include forwarding the second query to a first subset of a plurality of endpoint nodes and translating, at each endpoint node of the first subset, the second query into a third query having a format executable by a data source connected to the endpoint node. The third query can specify a level of the aggregation to be performed by the data source determined based upon a processing capability of the data source. The endpoint nodes can initiate execution of the third query by the data sources and provide (Continued)

an aggregated result including a result from the data source(s) to the service node.

20 Claims, 4 Drawing Sheets

(51) Int. Cl.
*G06F 16/27* (2019.01)
*G06F 16/28* (2019.01)
*G06F 16/2452* (2019.01)

(56) References Cited

U.S. PATENT DOCUMENTS

| | | | |
|---|---|---|---|
| 7,984,043 | B1 | 7/2011 | Waas |
| 8,145,652 | B2 | 3/2012 | Bent |
| 8,150,889 | B1 | 4/2012 | Bacthavachalu |
| 8,260,826 | B2 | 9/2012 | Chen |
| 8,285,710 | B2 | 10/2012 | Bent |
| 8,386,515 | B2 | 2/2013 | Bent |
| 8,458,166 | B2 | 6/2013 | Bent |
| 8,458,208 | B2 | 6/2013 | Vyvyan |
| 8,626,747 | B2 | 1/2014 | Bent |
| 8,868,544 | B2 * | 10/2014 | Witkowski ............ G06F 16/283 707/713 |
| 9,183,260 | B2 | 11/2015 | Bent |
| 9,251,293 | B2 | 2/2016 | Vyvyan |
| 9,460,173 | B2 | 10/2016 | Abrams |
| 9,471,647 | B2 | 10/2016 | Bent |
| 9,563,650 | B2 | 2/2017 | Balasubramanian |
| 9,716,649 | B2 | 7/2017 | Bent |
| 10,110,479 | B1 | 10/2018 | Ramachandran |
| 10,616,041 | B2 | 4/2020 | Vyvyan |
| 10,616,042 | B2 | 4/2020 | Vyvyan |
| 10,769,148 | B1 * | 9/2020 | Binkert ............ G06F 16/24542 |
| 11,120,001 | B2 | 9/2021 | Abrashkevich |
| 11,475,000 | B2 | 10/2022 | Abrashkevich |
| 2003/0115065 | A1 | 6/2003 | Kakivaya |
| 2005/0097569 | A1 | 5/2005 | Chandrasekaran |
| 2006/0129540 | A1 | 6/2006 | Hillis |
| 2007/0094166 | A1 | 4/2007 | Addison |
| 2009/0077036 | A1 | 3/2009 | Bent |
| 2009/0125540 | A1 | 5/2009 | Dettinger |
| 2010/0115100 | A1 | 5/2010 | Tubman |
| 2012/0016661 | A1 | 1/2012 | Pinkas |
| 2012/0166610 | A1 | 6/2012 | Doh |
| 2014/0089294 | A1 | 3/2014 | Shankar |
| 2014/0219278 | A1 | 8/2014 | Bent |
| 2014/0280037 | A1 | 9/2014 | Petride |
| 2015/0149436 | A1 | 5/2015 | McKenna |
| 2015/0370795 | A1 | 12/2015 | Ransil |
| 2016/0117369 | A1 | 4/2016 | Bent |
| 2017/0083588 | A1 | 3/2017 | Lang |
| 2017/0169071 | A1 | 6/2017 | Petri |
| 2019/0087457 | A1 | 3/2019 | Bellamkonda |
| 2019/0163775 | A1 | 5/2019 | Abrashkevich |
| 2019/0163783 | A1 | 5/2019 | Abrashkevich |
| 2019/0165992 | A1 | 5/2019 | Vyvyan |
| 2019/0165993 | A1 | 5/2019 | Vyvyan |
| 2019/0377721 | A1 | 12/2019 | Abrashkevich |

FOREIGN PATENT DOCUMENTS

| | | |
|---|---|---|
| CN | 106599043 A | 4/2017 |
| CN | 111344693 A | 6/2020 |
| WO | 2019106476 A1 | 6/2019 |

OTHER PUBLICATIONS

Abrashkevich, D. et al., "Aggregation in Dynamic and Distributed Computing Systems," U.S. Appl. No. 15/827,674, filed Nov. 30, 2017, now U.S. Pat. No. 11,475,000 B2, 45 pages.

Vyvyan, D., "Collaborative Triggers in Distributed and Dynamic Computing Systems," U.S. Appl. No. 15/827,812, filed Nov. 30, 2017, now U.S. Pat. No. 10,616,041 B2, 43 pages.

Vyvyan, D., "Collaborative Triggers in Distributed and Dynamic Computing Systems," U.S. Appl. No. 15/846,179, filed Dec. 18, 2017, now U.S. Pat. No. 10,616,042 B2, 43 pages.

Abrashkevich, D. et al., Table Discovery in Distributed and Dynamic Computing Systems, U.S. Appl. No. 15/827,623, filed Nov. 30, 2017, now U.S. Pat. No. 11,120,001 B2, 41 pages.

Abrashkevich, D. et al., Table Discovery in Distributed and Dynamic Computing Systems, U.S. Appl. No. 16/546,307, filed Aug. 21, 2019, now U.S. Pat. No. 11,106,651 B2, 41 pages.

"Working with the Federated Data" [online] eTutorials.org © 2008-2017 [retrieved Aug. 11, 2017], retrieved from the Internet: <http://etutorials.org/Misc/advanced+dba+certification+guide+and+reference/Chapter+7.+Federated+Database+Access/Working+with+the+Federated+Data/>, 6 pg.

Agrawal, A. et al., "Query Processing in Wireless Sensor Network," In Advances in Electronic and Electric Engineering, vol. 3, No. 1, pp. 1-6, 2013.

Bent, G., et al., "A dynamic distributed federated database," In Proc. of 2nd Ann. Conf. on the International Technology Alliance, Sep. 2008, 6 pg.

Bent, G., et al., "Experimental Evaluation of the Performance and Scalability of a Dynamic Distributed Federated Database," In Proc. of 3rd Ann. Conf. of the International Technology Alliance, Sep. 2009, 7 pg.

Mell, P. et al., "The NIST definition of cloud computing," National Institute of Standards and Technology Special Publication 800-145, Sep. 2011, [retrieved Nov. 30, 2017], retrieved from the Internet: <https://dx.doi.org/10.6028/NIST.SP.800-145>, 7 pg.

Pino, C. et al., "Evaluation of federated database for distributed applications in e-government," In 2013 IEEE 7th Int'l. Conf. on Application of Information and Communication Technologies (AICT), Oct. 23, 2013, pp. 1-5.

WIPO Appln. PCT/IB2018/059036, International Search Report and Written Opinion, 9 pg.

Stone, P.D. et al., "Query propagation behaviour in Gaian database networks," 2014, 8 pg.

\* cited by examiner

AGGREGATION IN DYNAMIC AND DISTRIBUTED COMPUTING SYSTEMS

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

This disclosure relates to performing aggregation in a dynamic and distributed computing system.

Aggregation is an important aspect of data processing. Data aggregation, or aggregation, refers to a process where information is gathered and expressed in summary form. Within database management, for example, aggregation may refer to a function that groups multiple rows together to calculate a single value or measure. Examples of aggregation include, but are not limited to, returning the smallest value in a given column (MIN), returning the sum of the numeric values in a given column (SUM), returning the average value of a given column (AVERAGE), returning the total number of values in a given column (COUNT), and returning the number of rows in a table (COUNT(*)).

A dynamic and distributed computing system generally refers to a computing environment with a large number of geographically dispersed and inter-connected devices or "nodes". The devices are able to establish connections with one or more other devices in a highly dynamic manner without a predetermined topology. Examples of topologies that may be used within a distributed and dynamic computing system include hierarchical, cyclic, linear, and broad. Further, a given distributed and dynamic computing system may be subdivided into portions, where each portion is implemented using one of the example topologies such that the computing system, when taken as a whole, includes multiple, different topologies.

Within a dynamic and distributed computing system, some devices disconnect from the computing system and are able to reconnect through the same network. In other cases, devices disconnect from the computing system and are able to rejoin through a different network. In still other cases, device network connections may be relatively stable. Many of the devices within these modern computing systems include data and, as such, may be queried or asked to perform some computation(s) on data.

The dynamic nature of these computing systems means that new devices may be continually added. As the number of connected devices continues to increase, so too does the amount of querying taking place in the computing environment and the amount of data being passed among the devices, which can significantly degrade computing system performance.

SUMMARY

One or more embodiments are directed to computer-implemented methods of aggregating data in a dynamic and distributed computing system. In an aspect, a computer-implemented method may include, in response to receiving, at a service node of a computing system, a first query specifying aggregation, translating the first query into a second query having a first canonical format specifying the aggregation. The method may include forwarding the second query to a first subset of a plurality of endpoint nodes of the computing system. The method may include translating, at each endpoint node of the first subset, the second query into a third query having a format executable by a data source connected to the endpoint node and specifying a level of the aggregation to be performed by the data source. The level of aggregation may be determined by each respective endpoint node based upon a processing capability of the data source coupled to the endpoint node. Each of the endpoint nodes is capable of initiating execution of the third query by the data source coupled thereto. The method may also include providing, from each endpoint node of the first subset to the service node, an aggregated result including a result from execution of the third query.

Within this disclosure, the term "service node" refers to a data processing system of a dynamic and distributed computing system that initially receives a query. The service node serves as a query entry point for the dynamic and distributed computing system. Further the service node is capable of performing final aggregation to provide a final query result to the entity that initially provided the query (e.g., the first query). Within this disclosure, the term "endpoint node" refers to a data processing system of a dynamic and distributed computing system that receives a version of the first query in a canonical format. Further aspects of the service node and the endpoint nodes are described herein in greater detail below.

In accordance with the inventive arrangements, the computing system is capable of adapting to the capabilities of the various different data sources that are included therein. For example, in addition to being dynamic and distributed, the various data sources coupled to endpoint nodes may be disparate or heterogeneous. The endpoint nodes, for example, are capable of generating queries that are executable by the data sources coupled to each respective endpoint. Further, the queries may be modified so that each data source is tasked with performing a level of aggregation that is determined based upon the capabilities of that data source. A data source may be capable of performing the entirety of the aggregation requested in the second query, some of the aggregation requested in the second query, or none of the aggregation requested in the second query. The third query is tailored by the endpoint node(s) to the capabilities of the data source. In this manner, the computing system is capable of pushing aggregations out to the data sources to reduce the amount of data that is propagated among the nodes of the network. The endpoint nodes are capable of pushing aggregation out to the data sources to the fullest extent possible based upon the capabilities of the data sources.

In another aspect, the computer-implemented method may optionally include translating, at each endpoint node of the first subset, the second query into a fourth query having a second canonical format. The computer-implemented method further may include forwarding, from each endpoint node of the first subset, the fourth query to an endpoint node of a second subset of the plurality of endpoint nodes. A version of the first query in one of the canonical formats may be propagated to each endpoint node of the computing system.

It should be appreciated that while a first subset and a second subset of the plurality of endpoint nodes are described, the querying operations described that take place among endpoint nodes may continue, e.g., be further distributed, to other subsets of the plurality of endpoint nodes.

In another aspect, each endpoint node of the second plurality of endpoint nodes has not received a version of the first query in one of the canonical formats. In accordance with the inventive arrangements, the computing system is capable of further translating the queries for distribution to other endpoint nodes. The further translation resulting in the second and/or fourth query and distribution thereof facilitates computationally efficient processing by those endpoint nodes that have not yet received a version of the query specified in a canonical form.

In another aspect, each endpoint node may be configured to aggregate results received from each child endpoint node that provides results thereto and forward the aggregated results to a parent endpoint node.

In accordance with the inventive arrangements, the computing system is capable of aggregating data at the various endpoint nodes throughout the computing system. By aggregating data at endpoint nodes determined from querying data sources with data received from other endpoint nodes (e.g., child endpoint nodes), the amount of data that needs to be propagated up to parent endpoint nodes can be reduced significantly. This reduces the data traffic flowing among nodes of the computing system thereby reducing the bandwidth requirements. Reduction in the data flows also improves overall speed/performance of the computing system. Aggregation at the endpoint nodes further reduces the computational burden placed on the service node of the computing system and avoids the pitfalls associated with using a central processing node type of architecture.

In another aspect, the computer-implemented method may include, in response to determining, at a selected endpoint node of the plurality of endpoint nodes, that the data source coupled to the selected endpoint node does not support the aggregation specified by the second query, generating the third query to specify a lesser level of the aggregation than specified by the second query. The computer-implemented method may also include performing, at the selected endpoint node, an operation on the result from the data source coupled to the selected endpoint node, wherein the operation is part of the aggregation specified by the second query.

In accordance with the inventive arrangements, the endpoint nodes are capable of ascertaining the data processing capabilities of the data source(s) coupled thereto. While the service node is unaware of the various data sources within the computing system, each endpoint node is aware of the data structure and data processing capabilities of the data sources coupled to that endpoint node. As such, the endpoint nodes are capable of translating the second query into a third query that confirms with the particular computing capabilities of the data source to which the third query is directed. Further, the endpoint node is capable of providing any of the functionality specified in the second query that is not supported by the data source. For example, in the event the data source is unable to perform aspects of the aggregation specified in the second query, the third query specifies only those operations that can be performed by the data source. The endpoint node, upon receiving the result from the data source, is capable of performing the remaining operations necessary to fully execute the aggregation specified by the second query.

In another aspect, translating the second query into the third query may include breaking the aggregation specified by the second query into a plurality of constituent operations specified by the third query.

In accordance with the inventive arrangements, each endpoint node, in generating a query that is executable by the data source coupled thereto, is capable of breaking the aggregation down into a plurality of constituent operations. A subset of these constituent operations may be included in the third query that is executed by the data source. Any of the remaining constituent operations of the aggregation not performed by the data source may be performed by the endpoint node that generated the third query. This allows the endpoint node to push down operations to the data source that are supported by the data source and provide the functionality of the data source. The endpoint node, by providing the functionality missing from the data source, is capable of keeping the amount of data propagated up to parent endpoint nodes to a minimum. For example, rather than forward complete results, either aggregated or partially aggregated results are propagated from child endpoint nodes to parent endpoint nodes of the computing system.

In another aspect, the first canonical format is specified using structured query language (SQL). In accordance with the inventive arrangements, the first query received by the service node may be specified in any of a variety of different formats. By using SQL to specify the queries propagated within the computing system among endpoint nodes, each endpoint node is able to execute and/or process the distributed queries after any translation performed by the service node.

One or more embodiments are directed to a computing system. For example, the computing system may be a dynamic and distributed computing system. In an aspect, the computing system may include a service node. The computing system may also include a plurality of endpoint nodes. The service node is capable of initiating operations including, in response to receiving a first query specifying aggregation, translating the first query into a second query having a first canonical format specifying the aggregation. The service node is also capable of initiating operations including forwarding the second query to a first subset of the plurality of endpoint nodes. Each endpoint node of the first subset is capable of initiating operations including translating the second query into a third query having a format executable by the data source connected to the endpoint node. The third query specifies a level of the aggregation to be performed by the data source that is determined based upon a processing capability of the data source. Each endpoint node of the first subset is further capable of initiating operations including initiating execution of the third query by the data source. Each endpoint node is further capable of initiating operations including providing an aggregated result including a result from the data source to the service node.

In another aspect, each endpoint node of the first subset is configured to initiate operations including translating the second query into a fourth query having a second canonical format. The selected endpoint node may also be configured to initiate operations including forwarding the fourth query to an endpoint node of a second subset of the plurality of endpoint nodes. A version of the first query in one of the canonical formats may be propagated to each endpoint node of the computing system.

In another aspect, each endpoint node of the second plurality of endpoint nodes has not received a version of the first query in one of the canonical formats.

In another aspect, each endpoint node is configured to aggregate results received from each child endpoint node that provides results thereto and forward the aggregated results to a parent endpoint node.

In another aspect, a selected endpoint node of the plurality of endpoint nodes is configured to initiate operations further including, in response to determining that the data source coupled to the selected endpoint node does not support the aggregation specified by the second query, generating the third query to specify a lesser level of the aggregation than specified by the second query. The selected endpoint node may also be configured to initiate operations including performing an operation on the result from the data source coupled to the selected endpoint node, wherein the operation is part of the aggregation specified by the second query.

In another aspect, translating the second query into the third query includes breaking the aggregation of the second query into a plurality of constituent operations specified by the third query.

In another aspect, the first canonical format is specified using SQL.

One or more embodiments are directed to a computer program product. In an aspect, the computer program product can include a computer readable storage medium having program instructions embodied therewith. The program instructions are executable by one or more processors to cause the one or more processors to initiate operations. The operations may include, in response to receiving, at a service node of a computing system, a first query specifying aggregation, translating the first query into a second query having a first canonical format and specifying the aggregation. The operations may include forwarding the second query to a first subset of a plurality of endpoint nodes of the computing system. The operations may include translating, at each endpoint node of the first subset, the second query into a third query having a format executable by a data source connected to the endpoint node and specifying a level of the aggregation to be performed by the data source determined based upon a processing capability of the data source. Each of the endpoint nodes may initiate execution of the third query by the data source coupled thereto. The operations may include providing, from each endpoint node of the first subset to the service node, an aggregated result including a result from execution of the third query.

In another aspect, the program instructions cause the one or more processors to initiate operations further including translating, at each endpoint node of the first subset, the second query into a fourth query having a second canonical format. The operations may include forwarding, from each endpoint node of the first subset, the fourth query to an endpoint node of a second subset of the plurality of endpoint nodes. A version of the first query in one of the canonical format is propagated to each endpoint node of the computing system.

In another aspect, each endpoint node of the second plurality of endpoint nodes has not received a version of the first query in one of the canonical formats.

In another aspect, the program instructions cause the one or more processors to initiate operations further including configuring each endpoint node to aggregate results received from each child endpoint node that provides results thereto and forward the aggregated results to a parent endpoint node.

In another aspect, the program instructions cause the one or more processors to initiate operations further including, in response to determining, at a selected endpoint node of the plurality of endpoint nodes, that the data source coupled to the selected endpoint node does not support the aggregation specified by the second query, generating the third query to specify a lesser level of the aggregation than specified by the second query. The operations may include performing, at the selected endpoint node, an operation on the result from the data source coupled to the selected endpoint node, wherein the operation is part of the aggregation specified by the second query.

In another aspect, translating the second query into the third query may include breaking the aggregation of the second query into a plurality of constituent operations specified by the third query.

In another aspect, the first canonical format may be specified using SQL.

One or more embodiments are directed to computer-implemented methods of aggregating data in a dynamic and distributed computing system. In an aspect, a computer-implemented method may include, receiving, at a selected endpoint node of a computing system, a first query specified in a first canonical format from a service node of the computing system. The first query specifies an aggregation. The computer-implemented method may include translating the first query into a second query having a format executable by a data source connected to the selected endpoint node and specifying a level of aggregation determined based upon a processing capability of the data source. The computer-implemented method may include initiating execution of the second query by the data source. The computer-implemented method may include aggregating a result received from the data source with a result received from at least one other endpoint node of the computing system based upon the first query. The computer-implemented method may include forwarding a result of the aggregating to the service node.

In another aspect, the computer-implemented method may include, in response to determining, at the selected endpoint node, that the data source does not support the aggregation specified by the first query, generating the second query to specify a lesser level of the aggregation than specified by the first query. The computer-implemented method may also include performing, at the selected endpoint node, an operation on the result from the data source, wherein the operation is part of the aggregation specified by the first query.

One or more embodiments are directed to a computing node of a dynamic and distributed computing system. In another aspect, the computing node may include a memory configured to store program instructions. The computing node may include a processor coupled to the memory. The processor, in response to executing the program instructions, is configured to initiate operations. The operations may include receiving a first query specified in a first canonical format from a service node of the computing system, wherein the first query specifies aggregation. The operations may include translating the first query into a second query having a format executable by a data source connected to the node and specifying a level of aggregation determined based upon a processing capability of the data source. The operations may include initiating execution of the second query by the data source. The operations may include aggregating a result received from the data source with a result received from at least one other node of the computing system based upon the first query. The operations may include forwarding a result of the aggregating to the service node.

In another aspect, the processor is configured to initiate operations further including, in response to determining that the data source does not support the aggregation specified by the first query, generating the second query to specify a lesser level of the aggregation than specified by the first query. The operations may also include performing an operation on the result from the data source, wherein the operation is part of the aggregation specified by the first query.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
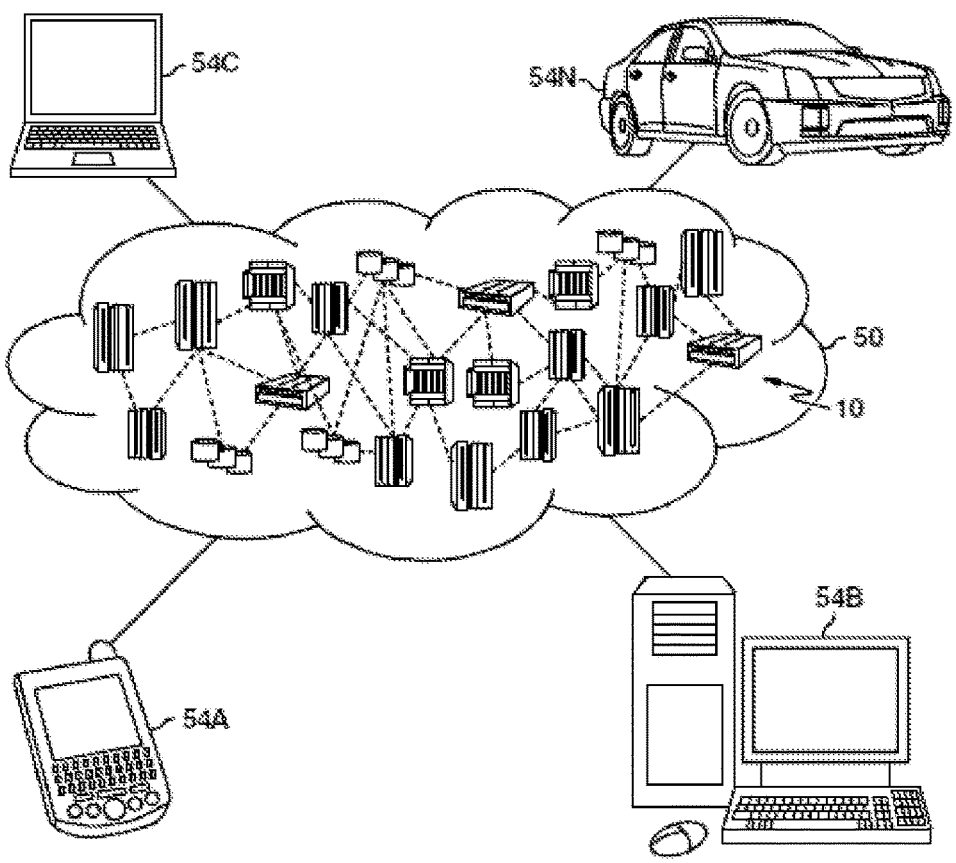
FIG. 1 depicts a cloud computing environment according to an embodiment of the present invention.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to performing aggregation in a dynamic and distributed computing system. The computing system is capable of using multiple independent data sources to perform aggregation in a computationally efficient manner. The data sources within the computing system may be heterogeneous. In other words, the data sources may be implemented as any of a variety of different types. In accordance with the inventive arrangements described herein, nodes within the computing system are capable of collaborating with other nodes to perform aggregation to reduce and/or eliminate the transmission of non-aggregated data among nodes within the computing system.

Within the computing system, various nodes are coupled to data sources. The data sources typically have some data processing capability. In some cases, for example, the data sources include a full-featured query processing engine. In other cases, the data sources have more limited data processing capabilities. For example, certain ones of the data sources may only be capable of performing data retrieval. In still other cases, however, the nodes may not have any data processing capability at all. Nodes of the computing environment are capable of translating queries so that the data sources perform as much aggregation as may be supported by each particular data source to reduce the amount of data that is propagated among nodes within the computing system.

In one or more embodiments, the nodes of the computing system are capable of performing aggregation including distributed aggregation. For example, nodes of the computing system are capable of receiving aggregated data from the data source(s). The nodes are capable of combining results obtained from the data sources with partially aggregated results that may be received from one or more other nodes within the computing system. In particular embodiments, the nodes are capable of performing additional aggregation on the combined results (e.g., the results from the connected data source and the partially aggregated results from other nodes). The nodes are capable of transmitting the aggregated results back to a service node of the computing system and/or to another node such as a node that did not provide partially aggregated results.

In conventional distributed databases, data is typically extracted from the data sources and transferred to a central processing node. The central processing node then performs any processing required, including aggregation. This type of architecture has several disadvantages. Transferring data from the data sources to the central processing node results in large data flows traversing from one node to another and consumes significant bandwidth. The data flows from the different data sources to the central processing node also must be coordinated, which adds complexity to the system. In addition, the central processing node must have sufficient computational capacity to handle the workload. This architecture effectively reduces the processing capability of the distributed system (e.g., the cumulative capacity of the various nodes and/or data sources included) down to the processing capability of the single central processing node, which is an inefficient use of computing resources.

Other conventional distributed databases rely upon well-defined structures that use a well-defined partitioning of the data among the nodes. For example, the data may be distributed according to a predefined set of columns determined in advance. Further, each node is typically configured to operate with the same type of data source (e.g., a particular type of Relational Database Management System or "RDBMS" that is the same across the distributed database). As such, the data source used by each node is known and is the same from one node to another. In addition, conventional distributed databases typically have shallow hierarchies of nodes with one coordinator that is directly connected to one or more data nodes. Further, such architectures are not considered dynamic since the devices are unable to join the distributed database in an ad-hoc manner where connections are dynamically established with other devices and/or nodes.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
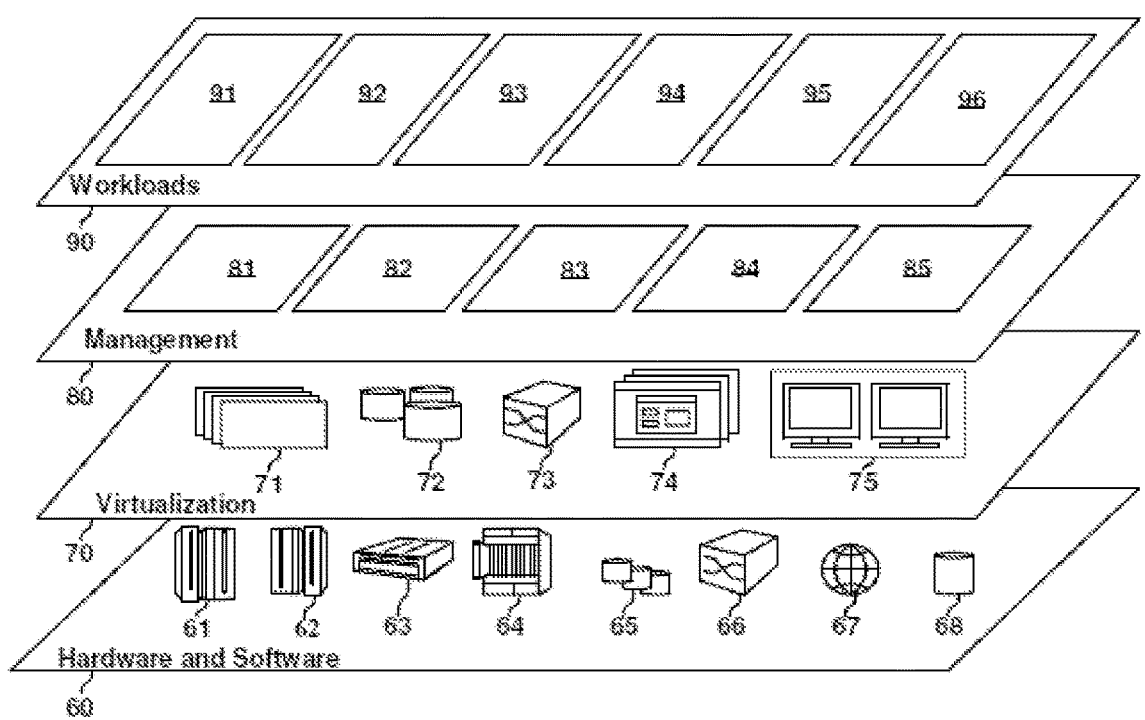
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and node management 96. Node management 96 may be operable across a plurality of nodes within a dynamic and distributed computing system to perform query translation, query propagation, aggregation including distributed aggregation, and other operations as described herein in greater detail below.

Figure 3:
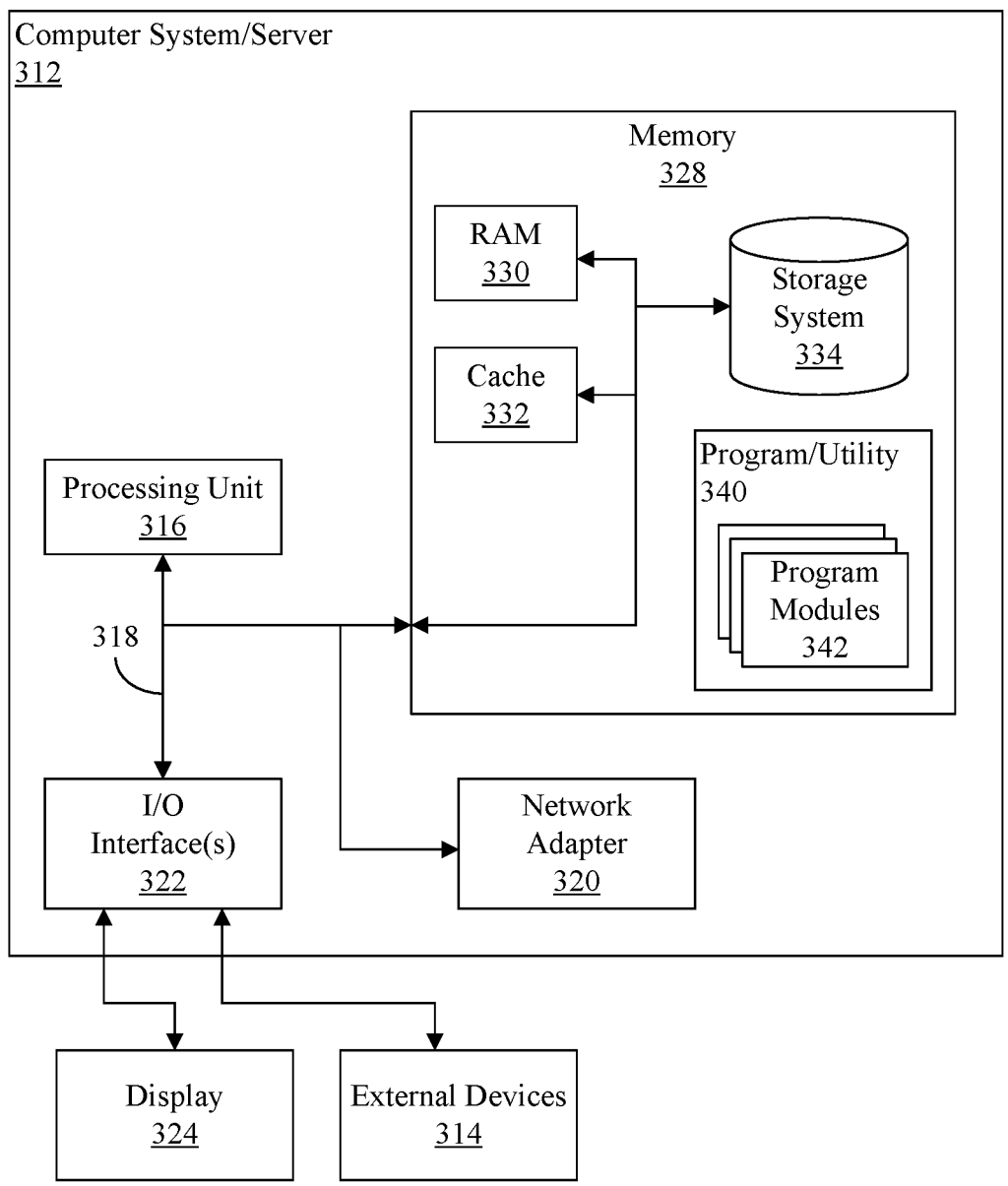
FIG. 3 depicts an example of a computing node.

FIG. 3 illustrates an example of a computing node 300. In one or more embodiments, computing node 300 is a cloud computing node. Computing node 300 is only one example of a suitable cloud computing node and is not intended to suggest any limitation as to the scope of use or functionality of embodiments of the invention described herein. Regardless, computing node 300 is capable of being implemented and/or performing any of the functionality set forth hereinabove.

Computing node 300 includes a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in computing node 300 is shown in the form of a general-purpose computing device. The components of computer system/server 312 may include, but are not limited to, one or more processors or processing units 316, a system memory (or "memory) 328, and a bus 318 that couples various system components including system memory 328 to processing unit 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 312 typically includes a variety of computer system readable media. Such media may be any available media that is accessible by computer system/server 312, and it includes both volatile and non-volatile media, removable and non-removable media.

Memory 328 can include computer system readable media in the form of volatile memory, such as random access memory (RAM) 330 and/or cache memory 332. Computer system/server 312 may further include other removable/non-removable, volatile/non-volatile computer system storage media. By way of example, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein. For example, one or more of the program modules may include node management 96 or portions thereof. Program/utility 340 is executable by processing unit (e.g., processor) 316. Program/utility 340 and any data items used, generated, and/or operated upon by computing node 300 are functional data structures that impart functionality when employed by computing node 300.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

While computing node 300 is used to illustrate an example of a cloud computing node, it should be appreciated that a computer system using an architecture the same as or similar to that shown in FIG. 3 may be used in a non-cloud computing implementation to perform the various operations described herein. In this regard, the example embodiments described herein are not intended to be limited to a cloud computing environment.

Figure 4:
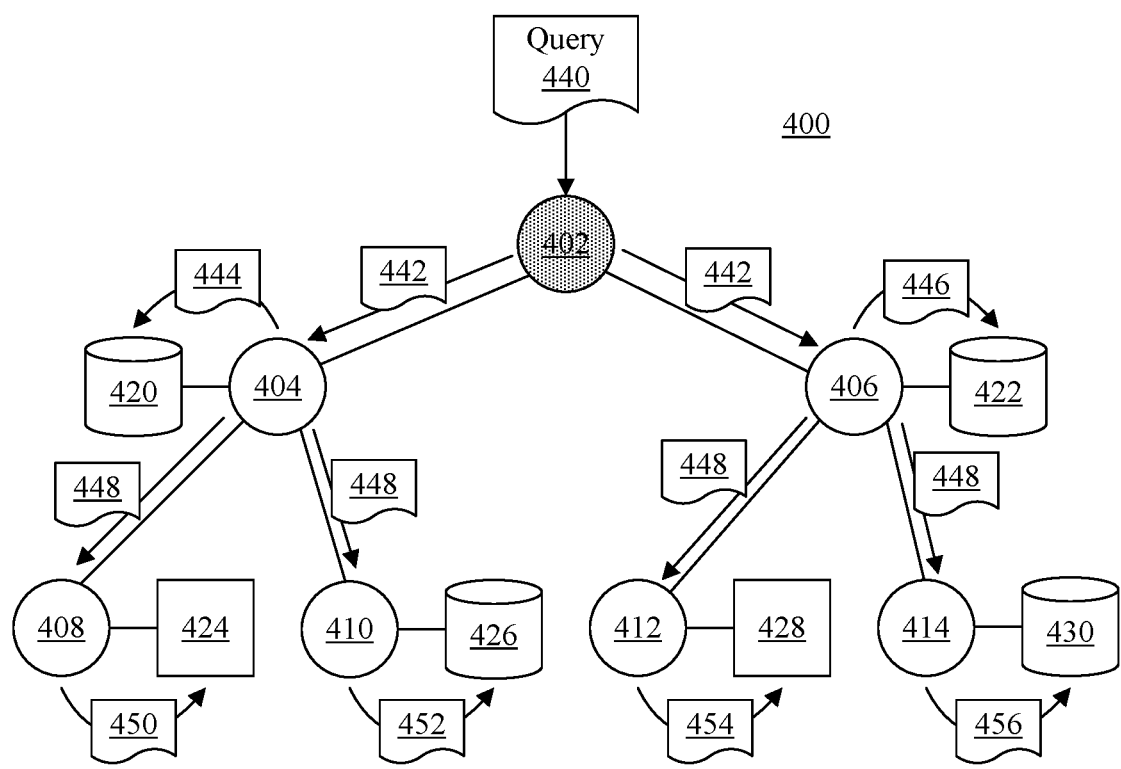
FIG. 4 depicts an example of a dynamic and distributed computing system.

FIG. 4 illustrates an example of a dynamic and distributed computing system 400. In the example of FIG. 4, computing system 400 includes a plurality of nodes 402, 404, 406, 408, 410, 412, and 414. In the example of FIG. 4, only three levels are illustrated and are depicted in a hierarchical topography. For example, computing system 400 includes a first level including node 402, a second level including nodes 404 and 406, and a third level including nodes 408, 410, 412, and 414.

It should be appreciated that a dynamic and distributed computing system may include a changing number of nodes and/or data sources as devices drop off and dynamically reconnect to nodes. Further, more than three levels may be included in an actual dynamic and distributed computing system. As such, a dynamic and distributed computing system may include many more nodes than are illustrated in the example of FIG. 4. Further, the topography of a dynamic and distributed computing system may vary from that illustrated in FIG. 4. Computing system 400 may have a hierarchical, cyclic, linear, or broad topology and/or any combination of the aforementioned topologies. Accordingly, FIG. 4 is provided for purposes of illustration and not limitation.

Each of nodes 402-414 may be implemented as a data processing system executing suitable operational software. For example, each of nodes 402-414 may be implemented using an architecture the same as or similar to the architecture described in connection with FIG. 3. Each of nodes 402-414 may execute node management 96 software or a variant of node management 96 software that is tailored to the particular functions of the node. As pictured, nodes 402-414 are interconnected. Node 402 is referred to herein as a "service node". Nodes 404, 406, 408, 410, 412, and 414 are referred to herein as "endpoint nodes". For purposes of discussion, a node that sends a query to another node is referred to as a parent node. The node that receives the query is referred to as the child node.

Computing system 400 is capable of implementing a query processing engine. The query processing engine is capable of accepting queries that may contain aggregation. In general, queries may be categorized into three general patterns. For example, a query may be implemented as a scan or a search of data for a single relation, joining data to other determined relations, or aggregating data that may come from either a single relation or from a joining of other relations. As previously discussed, examples of aggregation include, but are not limited to, returning the smallest value in a given column (MIN), returning the sum of the numeric values in a given column (SUM), returning the average value of a given column (AVERAGE), returning the total number of values in a given column (COUNT), and returning the number of rows in a table (COUNT(*)).

In the example of FIG. 4, nodes 402-414 are capable of establishing connections with one another in a dynamic manner. Selected ones of nodes 402-414 are capable of disconnecting from certain ones of nodes 402-414 and reconnecting to such nodes or other nodes on the same network. Other ones of nodes 402-414 are capable of disconnecting from certain ones of nodes 402-414 and reconnecting to such nodes or other nodes through a different network. Still other ones of nodes 402-414 are capable of maintaining relatively stable connections. Further, nodes 402-414 may be geographically distributed over large distances.

In one or more embodiments, computing system 400 is implemented as a federated database. A federated database is an example of a dynamic and distributed computing system. A federated database facilitates a "store-locally-query-anywhere" paradigm that includes a set of interconnected nodes, e.g., nodes 402-414. Each of the nodes is able to query across internal data sources and external data sources as if the data sources were one logical database. In particular embodiments, each of endpoint nodes 404, 406, 408, 410, 412, and 414 may be implemented as a federated Relational Database Management System (RDBMS) engine. For example, each of endpoint nodes 404, 406, 408, 410, 412, and 414 is able to query across internal data sources and external data sources as if the data sources were one logical database.

In general, within a federated database, each endpoint node is coupled to, or includes, an internal data source. Each endpoint node may also be coupled to one or more external data sources. Examples of external data sources include one or more different RDBMSs or other data sources such as flat files of data records. Examples of internal data sources include, but are not limited to, log files, network connection and/or data source metadata, and sensor data. As an illustrative and non-limiting example, internal data of the variety described may be loaded into an internal data source, e.g., an embedded database, of an endpoint node as opposed to loading such data within a separate database (e.g., an external data source).

A federated database allows a single query to access the databases (e.g., all data sources) through the interconnected RDBMS engines. The query is received by the federated database and propagated over connections between the various RDBMS engines. In general, federated database propagates the query throughout the constellation of endpoint nodes, e.g., to each endpoint node. The RDBMS engines (e.g., endpoint nodes 404, 406, 408, 410, 412, and 414) that control data sources such as databases targeted by the query are capable of translating the query into actions that are compatible with the databases that each respective RDBMS engine controls.

In one or more embodiments, service node 402 is configured to include greater processing capabilities than endpoint nodes 404-414. For example, service node 402 is capable of translating queries and detecting aggregation or logic included within such queries. In the example of FIG. 4, each of endpoint nodes 404-414 is coupled to a respective data source 420, 422, 424, 426, 428, and 430. For purposes of illustration, FIG. 4 does not distinguish between internal and external data sources. As discussed, some data sources have data processing capabilities. For example, data sources 420, 422, 426, and 428 may be implemented as databases (e.g., RDBMSs). Other data sources may have little or no data processing capability. For example, data sources 424 and 428 may be implemented as flat files of records. In the example of FIG. 4, each of endpoint nodes 404-414 is shown as being coupled to a single data source. In other embodiments, one or more or all of nodes 404-414 may be coupled to more than one data source.

In the example of FIG. 4, data sources 420, 422, 426, and 428 may be heterogeneous. For example, data source 420 may be a first type of RDBMS (e.g., as available from a first developer or provider), while data source 422 may be a second type of RDBMS that is different from data source 420 (e.g., as available from a second developer or provider). Data sources 426 and 428 may be the same or different. As an illustrative and non-limiting example, the particular language and/or type of structured query language (SQL) used by each of data sources 420, 422, 426, and 428 may not be the same. Further, the capabilities of data sources 420, 422, 426, and 428 may differ.

In the example of FIG. 4, service node 402 receives a query 440. Query 440 (e.g., a first query) may be sent by another data processing system and/or an application executing in another data processing system coupled to service node 402 via a network connection. In one or more embodiments, query 440 includes one or more aggregations. In the example of FIG. 4, only one service node is illustrated. In other embodiments, computer system 400 may include more than one service node. Service nodes serve as entry points for queries entering computing system 400. A service node is the first node of the computing system to receive a query sent from a source external to the computing system.

Service node 402 is capable of translating query 440 into query 442 (e.g., a second query). Query 442 has a different format than query 440. Service node 402 is capable of providing query 442 to one or more endpoint nodes within computing system 400. In the example of FIG. 4, service node 402 distributes query 442 to a first subset of endpoint nodes including endpoint nodes 404 and 406.

Each of endpoint nodes 404 and 406 is capable of translating query 442 into a format that is executable by the particular data source coupled to each respective endpoint node. For example, endpoint node 404 is capable of translating query 442 into query 444. Query 444 is executable by data source 420, which may be a particular RDBMS. Endpoint node 406 is capable of translating query 442 to query 446. Query 446 is executable by data source 422, which may be a different RDBMS than data source 420. As noted, since data sources 420 and 422 may be different types of data sources, query 446 may not execute on data source 420. Similarly, query 444 may not execute on data source 422.

In one or more embodiments, each of endpoint nodes 404 and 406 is capable of performing a further translation of query 442 into a query 448. Endpoint node 404 and endpoint node 406 provide query 448 to a second subset of endpoint nodes such as endpoint nodes 408, 410, 412, and 414. Each of endpoint nodes 408, 410, 412, and 414 is capable of translating query 448 into a format that is suitable for the particular data source coupled to each respective endpoint node (referred to herein as the "local data source" of an endpoint node).

For example, endpoint node 408 is capable of translating query 448 into query 450, which is specified in a format that is executable by data source 424. Data source 424 is the local data source for endpoint node 408. In one or more embodiments, in the case of data source 424 and other data sources of similar or same type as data source 424, endpoint node 408 (or another endpoint node) is capable of generating an internal query that is executed on data source 424. In particular embodiments, endpoint node 408 is capable of invoking a scan inline with the main processing to access data from data source 424.

Continuing, endpoint node 410 is capable of translating query 448 into query 452, which is specified in a format that is executable by data source 426. Data source 426 is the local data source for endpoint node 410. Endpoint node 412 is capable of translating query 448 into query 454, which is specified in a format that is executable by data source 428. Data source 428 is the local data source for endpoint node 412. Endpoint node 414 is capable of translating query 448 into query 456, which is specified in a format that is executable by data source 430. Data source 430 is the local data source for endpoint node 414.

In one or more embodiments, each of endpoint nodes 404-414, when translating a query into a format that is executable by the local data source, is capable of modifying the query based upon the capabilities of the local data source. For example, each endpoint node may be programmed with a listing of the capabilities, e.g., supported data processing operations, of the local data source(s) coupled thereto. In one or more embodiments, each endpoint node analyzes the received query to identify the particular operations included in the query that are supported by the local data source and those that are not. The endpoint node is capable of breaking a particular operation that is not supported by the local data source into a plurality of constituent operations that are supported by the local data source. The query directed to the local data source may specify one or more or all of the constituent operations that are supported by the local data source. As such, endpoint nodes are able to "push" operations, including aggregation, out to the data sources to the extent possible.

As an illustrative and non-limiting example, an aggregation such as AVERAGE includes operations such as SUM and dividing by the COUNT of the summed elements. In this example, the constituent operations are SUM and COUNT. In this particular example, the constituent operations are also aggregations. Referring to endpoint node 404, for example, query 442 may specify an AVERAGE type of aggregation that is to be performed. Endpoint node 404 is capable of determining whether data source 420 supports an AVERAGE type of aggregation. If so, endpoint node 404 is capable of including the AVERAGE aggregation in query 444, though specified in a format and/or syntax that is executable by data source 420. If not, endpoint node 404 is capable of breaking the AVERAGE aggregation out into a SUM operation and a COUNT operation. Endpoint node 404 includes the SUM operation and the COUNT operation within query 444 in lieu of the AVERAGE aggregation. As will be described below in greater detail, endpoint node 404 is capable of completing the requested AVERAGE type aggregation from query 442 by performing a division of the SUM result by the COUNT result received from data source 420.

In one or more embodiments, endpoint nodes are capable of pushing as much aggregation as possible to the local data sources. Endpoint nodes are capable of compensating for any processing capability missing from the local data sources. Further, endpoint nodes are capable of combining partially aggregated results from local data sources with aggregated and/or partially aggregated results from other endpoint nodes, e.g., child endpoint nodes, to compute a new aggregated and/or partially aggregated result that may be provided to a parent endpoint node in the computing system and/or to service node 402.

Thus, each of endpoints nodes 408, 410, 412, and 414 is capable of receiving results from respective data sources 424, 426, 428, and 430 and/or from child nodes (not shown). Each endpoint node is capable of performing any operations not supported by the local data sources as described in the example above. Endpoint nodes 408, 410, 412, and 414 are capable of aggregating results obtained from local data sources with results obtained from child endpoint nodes. Endpoint nodes 408, 410, 412, and 414 are further capable of sending the aggregated and/or partially aggregated results obtained from the local data sources and/or the child endpoint nodes to the parent endpoint nodes that forwarded the query.

For example, since endpoint node 406 sent query 448 to endpoint node 408, endpoint node 408 receives results from data source 424 in response to execution of query 450, optionally performs one or more operations not supported by data source 424 as specified by query 448, and provides the results back to endpoint node 404. As noted, endpoint node 408 is also capable of receiving results from one or more child endpoint nodes (not shown), aggregating such results with results from data source 424, and providing the aggregated results to endpoint node 404. Similarly, since endpoint node 404 sent query 448 to endpoint node 410, endpoint node 410 receives results from data source 426 in response to execution of query 452, optionally performs one or more operations not supported by data source 426 as specified by query 448, and provides the results back to endpoint node 404. Endpoint node 410 is also capable of receiving results from one or more child endpoint nodes (not shown), aggregating such results with results from data source 426, and providing the aggregated results to endpoint node 404. Endpoint node 404 further receives results from data source 420 in response to execution of query 444.

Since endpoint node 406 sent query 448 to endpoint node 412, endpoint node 412 receives results from data source 428 in response to execution of query 454, optionally performs one or more operations not supported by data source 428 as specified by query 454, and provides the results back to endpoint node 406. As noted, endpoint node 412 is also capable of receiving results from one or more child endpoint nodes (not shown), aggregating such results with results from data source 428, and providing the aggregated results to endpoint node 406. Similarly, since endpoint node 406 sent query 448 to endpoint node 414, endpoint node 414 receives results from data source 430 in response to execution of query 456, optionally performs one or more operations not supported by data source 430 as specified by query 456, and provides the results back to endpoint node 406. Endpoint node 414 is also capable of receiving results from one or more child endpoint nodes (not shown), aggregating such results with results from data source 430, and providing the aggregated results to endpoint node 406. Endpoint node 406 further receives results from data source 422 in response to execution of query 446.

Endpoint node 404 is capable of aggregating any results received from child endpoint nodes including endpoint nodes 408 and 410 and any other endpoint nodes (not shown) with results received from data source 420 and provide the resulting aggregated results to service node 402. Endpoint node 406 is also capable of aggregating any results received from child endpoint nodes such as endpoint nodes 412 and 414 and any other endpoint nodes (not shown) with results received from data source 422 and providing the results to service node 402.

In one or more embodiments, endpoint nodes are capable of performing data processing operations that the data sources are incapable of performing. Referring to the prior example where query 442 specifies an AVERAGE type of aggregation that is not supported by data source 420, endpoint node 404 is capable of performing the remaining operations necessary to complete the AVERAGE type of aggregation. For example, as noted, query 444 includes a SUM operation and a COUNT operation that is executed by data source 420. Endpoint node 404 receives results from data source 420 that include the sum and the count. In this example, endpoint node 404 is capable of completing the AVERAGE aggregation by dividing the result of the SUM by the result of the COUNT. As such, endpoint node 404 is capable of supplementing the functionality of data source 420 by providing data processing capabilities not supported by data source 420 in order to perform the aggregation specified in query 442.

Though not discussed specifically, it should be appreciated that other ones of the endpoint nodes illustrated in FIG. 4 are capable of performing the same or similar operations described in connection with any of the endpoint nodes described herein. For example, each of the endpoint nodes is capable of performing a translation on a received query to generate a query that is executable by the local data source(s) coupled thereto. Each endpoint node is capable of performing a further translation of the received query that may be provided to one or more other endpoint nodes. Further, each endpoint node is capable of receiving results from the local data sources and receiving results from child endpoint nodes (including child endpoint nodes further down in the hierarchy shown that propagate up through parent endpoint nodes). The endpoint nodes are capable of aggregating any received results and sending the resulting data back to the endpoint node from which the query was sent, e.g., a parent endpoint node.

In the example of FIG. 4, aggregation performed at the various endpoint nodes reduces the amount of data that is transmitted within computing system 400. Each endpoint node collaborates with other endpoint nodes to perform aggregation in the local data sources and/or locally within the endpoint node itself by providing functionality lacking in the endpoint nodes prior to forwarding query results to reduce the amount of data propagating through the network. The example of FIG. 4 further illustrates how the amount of data processing performed by service node 402 is significantly reduced when compared with the processing that would otherwise be performed were service node 402 to be implemented as a central processing node as previously described.

FIG. 4 is provided for purposes of illustration and not limitation. A computing system as described in connection with FIG. 4 may include fewer or more nodes. Further, the types of data sources to which nodes may be coupled is not intended to be limited to the particular examples shown in FIG. 4.

Figure 5:
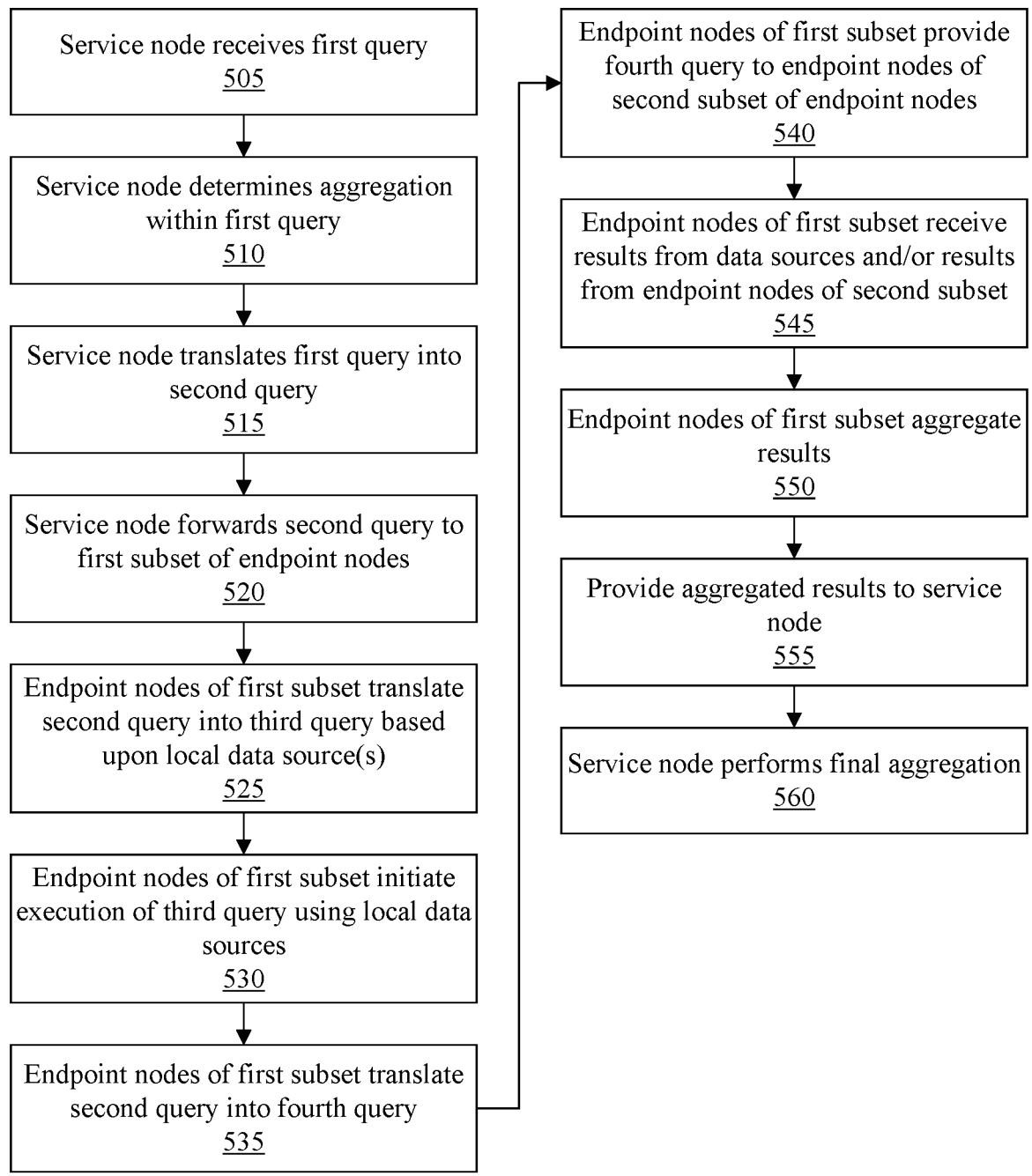
FIG. 5 depicts an example method for performing aggregation in a dynamic and distributed computing system.

FIG. 5 illustrates an example method 500 of performing aggregation in a dynamic and distributed computing system. The computing system may be implemented substantially as described in connection with FIGS. 1, 2, 3, and 4.

In block 505, the service node receives a first query. For example, service node 402 receives query 440. In one or more embodiments, the first query is specified using SQL. In one or more other embodiments, the first query is specified in a format other than SQL. For example, the first query may be specified in a language such as XQuery (XML Query). In another example, the first query may be specified using a procedural format.

Listing 1 illustrates an example implementation of a first query that may be received by the service node. For purposes of illustration, the example of Listing 1 is specified in SQL ---
LISTING 1
---
SELECT transaction_date
   , AVERAGE(sales)
  FROM daily_sales
  WHERE region = 'East Coast'
    AND transaction_date_between '2017-09-01' AND '2017-10-31'
  GROUP BY transaction_date

---

In block 510, the service node determines the aggregation(s) specified within the first query. In an example, the service node may include a compiler and a parser. The service node is capable of parsing the first query to detect aggregations specified therein. For example, referring to Listing 1, the service node detects the inclusion of the AVERAGE type of aggregation.

In one or more embodiments, the service node parses the first query using information about the table structures of the data sources. As an illustrative and non-limiting example, the service node is capable of determining the particular tables that are targeted by the first query and the particular portions of data (e.g., columns) that are to be aggregated. The service node is capable of determining the expressions that are being aggregated upon and, for example, the "group by" clause columns or expressions which form the key for the aggregation(s).

In one or more embodiments, the service node is capable of distinguishing between portions of the first query that are to be performed locally within the service node and portions of the first query that are to be pushed out to the endpoint nodes of the computing system. Accordingly, the service node is capable of determining portions of the first query that have to be executed by the service node. An example of a portion of a query that has to be performed by the service node is a final aggregation that cannot be pushed out to endpoint nodes of the computing system.

The service node is also capable of determining the portions of the first query that can be pushed out to endpoint nodes of the computing system. Examples of portions of a query that can be pushed out to endpoint nodes include aggregations that need not be performed by the service node and that may be performed by local data sources or local data sources in combination with the endpoint node managing such local data sources. For example, the service node is capable of determining the particular aggregations that can be pushed out to the endpoint nodes based upon the aggregate itself and the topology of the computing system. As an illustrative and non-limiting example, aggregations such as MIN, MAX, and SUM distribute to endpoint nodes as MIN, MAX, and SUM, respectively. If the first subset of endpoint nodes contains one node, then no final aggregation is needed to combine the results. By comparison, the aggregation AVERAGE does require the service node to perform the final processing of the division portion of the AVERAGE aggregation.

In block 515, the service node translates the first query into a second query. For example, referring to FIG. 4, service node 402 translates query 440 into query 442. In one or more embodiments, the second query has a first canonical format. In particular embodiments, the second query is specified in, or is translated into, SQL. The service node generates the second query in a format that is executable by the endpoint nodes of the computing system. The second query may specify any aggregation(s) that are to be pushed out to the endpoint nodes. The service node, for example, performs the translation of the first query to build the second query. In particular embodiments, the second query specifies the particular query and/or queries that are to be pushed down to each of the endpoint nodes of the computing system.

Listing 2 illustrates an example implementation of the second query generated by the service node and sent out to one or more endpoint nodes (e.g., the first subset of endpoint nodes). and includes a distinction of DISTRIBUTED_AGG and DATASOURCE_TABLE to indicate that processing is to be further distributed beyond the receiving endpoint node (e.g., the endpoint node(s) of the first subset).

---
LISTING 2
---
SELECT transaction_date
  , sales_sum
  , sales_count
  FROM DISTRIBUTED_AGG ( SELECT transaction_date
    , SUM(sales)  AS sales_sum
    , COUNT(sales) AS sales_count
    FROM DATASOURCE_TABLE(DAILY_SALES)
    WHERE region   = 'East Coast'
    AND transaction_date BETWEEN '2017-09-01' AND
    '2017-10-31'
    GROUP BY transaction_date
  );

---

In block 520, the service node forwards the second query to one or more endpoint nodes belonging to a first subset of the endpoint nodes. The service node is capable of pushing the second query out over a relatively small number of connections into the broad constellation of endpoint nodes of the computing system.

In block 525 the endpoint nodes of the first subset of endpoint nodes translate the second query into a third query based upon the data source coupled to each respective one of the endpoint nodes of the first subset. Referring to FIG. 4, for example, the first subset of endpoint nodes includes endpoint nodes 404 and 406. Endpoint node 404 is capable of translating query 442 into query 444. Query 444 is specified in a format that is executable by data source 420. Endpoint node 406 is capable of translating query 442 into query 446. Query 446 is specified in a format that is executable by data source 422.

In one or more embodiments, the endpoint nodes of the first subset are capable of generating the third query to specify a level of aggregation that is determined based upon a processing capability of the local data source. For example, the endpoint nodes of the first set are capable of translating the second query in the first canonical format having one or more aggregations into a third query that includes aggregations supported by (e.g., directly executable by) the local data source.

Each of the endpoint nodes is aware of the different local data sources connected to that endpoint node in terms of data structures (e.g., tables) and data processing capabilities. As such, each endpoint node is able to determine how much of the second query and/or aggregation(s) specified therein may be performed by the local data sources. The endpoint node is capable of providing any missing functionality. For example, the endpoint nodes of the first subset are capable of detecting one or more aggregations in the second query that are not supported by the local data source. In that case, the endpoint nodes of the first subset are capable of breaking down unsupported aggregations into a plurality of constituent operations that are supported by the local data source. In this manner, the endpoint nodes are capable of initiating a large, or maximum, amount of aggregation within the data sources and internally within the endpoint nodes themselves so that any results that may be propagated back to a parent endpoint node and/or to the service node are reduced in size or the smallest that may be possible.

In another example, the endpoint node is capable of analyzing the second query to determine whether an aggregation is operating on results from two or more different data sources. If so, the aggregation may not be pushed down to the data source level as no one particular data source will be able to perform the aggregation. As an illustrative example, if query 442 specifies an aggregation that is a join of data from two different data sources coupled to endpoint node 404, endpoint node 404 is capable of recognizing such a condition. Endpoint node 404 is capable of generating a query to each of the data sources that is natively executable by each respective data source to obtain the data for the join operation. Upon receipt of the data from each data source, endpoint node 404 is capable of performing the join operation internally.

Listing 3 illustrates an example implementation of a third query generated by an endpoint node for execution on a local data source (e.g., a relational database).

---

LISTING 3

```
SELECT TRANSACTION_DATE
    , SUM(SALES) AS SALES_SUM
    , COUNT(SALES) AS SALES_COUNT
    FROM TABLE(
    SELECT TRANSACTION_DATE
        , SALES
        WHERE REGION    = RTRIM('East Coast')
        AND TRANSACTION_DATE >= '2017-09-01'
        AND TRANSACTION_DATE <= '2017-10-31'
        )
    GROUP BY TRANSACTION_DATE;
```

---

In block 530, the endpoint nodes of the first subset of endpoint nodes initiate execution of the third query using the local data sources. For example, each endpoint node of the first subset is capable of submitting the third query generated therein to the local data source for execution.

In block 535, the endpoint nodes of the first subset of endpoint nodes optionally translate the second query into a fourth query having a second canonical form. For example, endpoint nodes 404 and 406 are capable of translating query 442 into query 448. Query 448 may be specified in a second canonical format. Query 448 also may be specified in SQL.

Listing 4 illustrates an example implementation of the fourth query generated by an endpoint node of the first subset to be provided to endpoint node(s) of a second subset of endpoint nodes. In the example of Listing 4, the fourth query, as compared to the second example query of Listing 2, includes additional aggregation such as SUM (SALES_SUM) and SUM(SALES_COUNT). The service node is capable of performing the same aggregation as part of the final aggregation.

---

LISTING 4

```
SELECT transaction_date
    , SUM(sales_sum)   as sales_sum
    , SUM(sales_count) as sales_count
    FROM DISTRIBUTED_AGG ( SELECT transaction_date
        , SUM(sales)   AS sales_sum
        , COUNT(sales) AS sales_count
        FROM DATASOURCE_TABLE(DAILY_SALES)
        WHERE region    = 'East Coast'
        AND transaction_date >= '2017-09-01'
        AND transaction_date <= '2017-10-31'
        GROUP BY transaction_date
        )
    GROUP BY transaction_date;
```

---

In block 540, the endpoint nodes of the first subset provide the fourth query to endpoint nodes belonging to the second subset of the endpoint nodes. For example, endpoint nodes 404 and 406 distribute query 448 to endpoint nodes 408, 410, 412, and 414 that have not yet received a version of query 440 specified in a canonical form (e.g., whether the second query or the fourth query).

In one or more embodiments, the first subset of nodes provides the fourth query to one or more other endpoint nodes of the computing system that form the second subset of nodes. As discussed, a dynamic and distributed computing system is capable of using a variety of different topologies and combinations of different topologies where different portions of the dynamic and distributed computing system use different ones of the topologies. As such, while the example of FIG. 4 has a hierarchical topology, this need not be the case and is used only for purposes of illustration. Thus, the propagation of the query in a canonical format throughout the computing system may differ from that illustrated in FIG. 4. The first and/or second subset of endpoint nodes may include peer endpoint nodes such that the distribution of the fourth query to endpoint nodes may vary from that illustrated based upon the topology and/or topologies used to organize such endpoint nodes.

In one or more embodiments, further distribution of the query in a canonical format to remaining endpoint nodes of the computing system that have not yet received a version of the initial query in a canonical format may receive the fourth query as propagated from parent endpoint nodes. For example, further translation of the query into a third canonical format need not be performed. As such, the query, whether in the first or second canonical format, may be propagated to the endpoint nodes of the computing system.

In block 545, the endpoint nodes of the first subset receive results from the respective data sources and/or the results from the endpoint nodes of the second subset. For example, endpoint node 404 receives results from execution of query 444 by data source 420. Endpoint node 406 receives results from execution of query 446 by data source 422. In another example, endpoint node 404 receives results from endpoint nodes 408 and 410 and/or any child endpoint nodes beneath and/or coupled to endpoint nodes 408 and 410. Similarly, endpoint node 406 receives results from endpoint nodes 412 and 414 and/or any child endpoint nodes beneath and/or coupled to endpoint nodes 412 and 414. In one or more embodiments, each endpoint node is capable of receiving results from the local data source(s) and from the subset of endpoint nodes to which the endpoint node distributed a canonical form of the initial query. In this manner, results may be propagated up from child endpoint nodes to parent endpoint nodes with aggregation being performed at the endpoint nodes as the results propagate back to the service node.

In block 550, the endpoint nodes of the first subset aggregate results from the data sources and/or results from the endpoint nodes of the second subset. Each of the endpoint nodes is capable of performing further processing, including aggregation, of results from the local data source(s) and/or results from other endpoint nodes as specified by the canonical form of the query received by the endpoint node.

As discussed, in some cases the results received are aggregated or at least partially aggregated by the local data source. In other cases, where the local data source does not support one or more aggregations, the endpoint node, in response to receiving the results, is capable of performing an aggregation on the results from the local data source based upon query 442 (e.g., performing any further operations specified by query 442 not performed by the local data source). If, for example, query 442 specifies an AVERAGE type of aggregation that is not supported by data source 420, endpoint node 404 is capable of generating query 444 to specify a SUM operation and a COUNT operation in a syntax that is executable by data source 420. In response to receiving the results from data source 420, endpoint node 404 completes the AVERAGE aggregation by dividing the result of the SUM by the result of the COUNT.

In another example, where data source 422 does support an AVERAGE type of aggregation, endpoint node 406 is capable of generating query 446 to specify the AVERAGE type of operation in a syntax that is executable by data source 422. In that case, endpoint node 406 receives the result of the AVERAGE back from data source 422 as a result. Endpoint node 406 need not perform any further processing of the received result in terms of the aggregation specified by query 442. In any case, endpoint node 406 is capable of aggregating any results from data source 420 with results received from endpoint nodes 408 and 410.

As an illustrative and non-limiting example, endpoint node 404 is capable of processing results received from data source 420, results received from endpoint node 408, and results received from endpoint node 410 based upon query 442. For example, query 442 specifies the processing and aggregation to be performed. Endpoint node 406 performs any processing and aggregation specified by query 442 that has not yet been performed prior to passing results back to service node 402. It should be appreciated that each of the endpoint nodes of the computing system is capable of operating as described when results are received from a local data source and/or another endpoint node.

As discussed, the computing system may include significantly more endpoint nodes organized according to one or more different topologies. In this regard, the computing system may include a third subset of endpoint nodes that receive queries from endpoint nodes of the second subset, a fourth subset of endpoint nodes that receive queries from the endpoint nodes of the third subset, and so forth. Deeper hierarchies than illustrated in FIG. 4 may be used where queries and results propagate from subset of endpoint nodes to subset of endpoint nodes as generally described with reference to the first and the second subsets of endpoint nodes.

In block 555, the endpoint nodes of the first subset provide aggregated results to the service node. In block 560, the service node, in response to receiving the aggregated results from the endpoint nodes of the first subset is capable of performing any final aggregation that may be required. In block 565, the service node is capable of providing a final result to the first query to the requesting system and/or application.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. Notwithstanding, several definitions that apply throughout this document now will be presented.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method by a first endpoint node of a first subset of a plurality of endpoint nodes of a computing system include a service node, comprising:
    receiving, at the first endpoint node, a second query;
    translating, by the first endpoint node, the second query into a third query having a format executable by a data source connected to the first endpoint node and specifying a level of an aggregation to be performed by the data source determined based upon a processing capability of the data source;
    initiating execution of the third query by the data source; and
    providing, by the first endpoint node to the service node, an aggregated result including a result from the execution of the third query, wherein
    the service node is configured to:
        receive a first query specifying the aggregation, and
        translate the first query into the second query having a first canonical format and specifying the aggregation.

2. The computer-implemented method of claim 1, wherein
    the second query is translated at the first endpoint node into a fourth query having a second canonical format,
    the fourth query is forwarded from the first endpoint node to an endpoint node of a second subset of the plurality of endpoint nodes, and
    a version of the first query in one of the canonical formats is propagated to each endpoint node of the computing system.

3. The computer-implemented method of claim 2, wherein
    each endpoint node of a second plurality of endpoint nodes has not received a version of the first query in one of the canonical formats.

4. The computer-implemented method of claim 2, wherein
    each endpoint node is configured to aggregate results received from each child endpoint node that provides results thereto and forward the aggregated results to a parent endpoint node.

5. The computer-implemented method of claim 1, wherein
    the first endpoint node is configured to perform in response to determining, at a selected endpoint node of the plurality of endpoint nodes, that the data source coupled to the selected endpoint node does not support the aggregation specified by the second query, generating the third query to specify a lesser level of the aggregation than specified by the second query,
    an operation on the result from the data source coupled to the selected endpoint node is performed at the selected endpoint node, and
    the operation is part of the aggregation specified by the second query.

6. The computer-implemented method of claim 1, wherein
    the translating the second query into the third query includes breaking the aggregation specified by the second query into a plurality of constituent operations specified by the third query.

7. The computer-implemented method of claim 1, wherein
    the first canonical format is specified using structured query language.

8. A first endpoint node of a first subset of a plurality of endpoint nodes of a computing system include a service node, comprising:
    a computer hardware processor configured to perform:
        receiving, at the first endpoint node, a second query;
        translating, by the first endpoint node, the second query into a third query having a format executable by a data source connected to the first endpoint node and specifying a level of an aggregation to be performed by the data source determined based upon a processing capability of the data source;
        initiating execution of the third query by the data source; and
        providing, by the first endpoint node to the service node, an aggregated result including a result from the execution of the third query, wherein
    the service node is configured to:
        receive a first query specifying the aggregation, and
        translate the first query into the second query having a first canonical format and specifying the aggregation.

9. The first endpoint node of claim 8, wherein
    the second query is translated at the first endpoint node into a fourth query having a second canonical format,
    the fourth query is forwarded from the first endpoint node to an endpoint node of a second subset of the plurality of endpoint nodes, and
    a version of the first query in one of the canonical formats is propagated to each endpoint node of the computing system.

10. The first endpoint node of claim 9, wherein
    each endpoint node of a second plurality of endpoint nodes has not received a version of the first query in one of the canonical formats.

11. The first endpoint node of claim 9, wherein
    each endpoint node is configured to aggregate results received from each child endpoint node that provides results thereto and forward the aggregated results to a parent endpoint node.

12. The first endpoint node of claim 8, wherein
the first endpoint node is configured to perform in response to determining, at a selected endpoint node of the plurality of endpoint nodes, that the data source coupled to the selected endpoint node does not support the aggregation specified by the second query, generating the third query to specify a lesser level of the aggregation than specified by the second query,
an operation on the result from the data source coupled to the selected endpoint node is performed at the selected endpoint node, and
the operation is part of the aggregation specified by the second query.

13. The first endpoint node of claim 8, wherein
the translating the second query into the third query includes breaking the aggregation specified by the second query into a plurality of constituent operations specified by the third query.

14. The first endpoint node of claim 8, wherein
the first canonical format is specified using structured query language.

15. A computer program product comprising
a computer readable storage medium having program instructions embodied therewith,
the program instructions, which when executed by a first endpoint node of a first subset of a plurality of endpoint nodes of a computing system include a service node, cause the first endpoint node to perform:
  receiving, at the first endpoint node, a second query;
  translating, by the first endpoint node, the second query into a third query having a format executable by a data source connected to the first endpoint node and specifying a level of an aggregation to be performed by the data source determined based upon a processing capability of the data source;
  initiating execution of the third query by the data source; and
  providing, by the first endpoint node to the service node, an aggregated result including a result from the execution of the third query, wherein
  the service node is configured to:
    receive a first query specifying the aggregation, and
    translate the first query into the second query having a first canonical format and specifying the aggregation.

16. The computer program product of claim 15, wherein
the second query is translated at the first endpoint node into a fourth query having a second canonical format,
the fourth query is forwarded from the first endpoint node to an endpoint node of a second subset of the plurality of endpoint nodes, and
a version of the first query in one of the canonical formats is propagated to each endpoint node of the computing system.

17. The computer program product of claim 16, wherein
each endpoint node of a second plurality of endpoint nodes has not received a version of the first query in one of the canonical formats.

18. The computer program product of claim 16, wherein
each endpoint node is configured to aggregate results received from each child endpoint node that provides results thereto and forward the aggregated results to a parent endpoint node.

19. The computer program product of claim 15, wherein
the first endpoint node is configured to perform in response to determining, at a selected endpoint node of the plurality of endpoint nodes, that the data source coupled to the selected endpoint node does not support the aggregation specified by the second query, generating the third query to specify a lesser level of the aggregation than specified by the second query,
an operation on the result from the data source coupled to the selected endpoint node is performed at the selected endpoint node, and
the operation is part of the aggregation specified by the second query.

20. The computer program product of claim 15, wherein
the translating the second query into the third query includes breaking the aggregation specified by the second query into a plurality of constituent operations specified by the third query.

* * * * *